US011440846B2

(12) United States Patent
Lemaitre et al.

(10) Patent No.: US 11,440,846 B2
(45) Date of Patent: Sep. 13, 2022

(54) SOLUTION FOR FORMING INSULATION COATING AND GRAIN-ORIENTED ELECTRICAL STEEL SHEET

(71) Applicant: Nippon Steel Corporation, Tokyo (JP)

(72) Inventors: Regis Lemaitre, Bethune (FR); Ludger Lahn, Moers (DE); Carsten Schepers, Raesfeld (DE); Shuichi Yamazaki, Tokyo (JP); Kazutoshi Takeda, Tokyo (JP); Masaru Takahashi, Tokyo (JP); Hirohiko Sato, Tokyo (JP); Koji Kanehashi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 14/766,560

(22) PCT Filed: May 27, 2013

(86) PCT No.: PCT/EP2013/060874
§ 371 (c)(1),
(2) Date: Aug. 7, 2015

(87) PCT Pub. No.: WO2014/121853
PCT Pub. Date: Aug. 14, 2014

(65) Prior Publication Data
US 2015/0368158 A1    Dec. 24, 2015

(30) Foreign Application Priority Data
Feb. 8, 2013    (EP) ..................................... 13154543

(51) Int. Cl.
*C04B 28/34*    (2006.01)
*C23C 22/18*    (2006.01)
(Continued)

(52) U.S. Cl.
CPC ............ *C04B 28/34* (2013.01); *C04B 14/062* (2013.01); *C21D 8/1283* (2013.01); *C23C 22/08* (2013.01);
(Continued)

(58) Field of Classification Search
None
See application file for complete search history.

(56) References Cited

U.S. PATENT DOCUMENTS 2,892,797 A    6/1959    Alexander et al.
3,856,568 A *  12/1974   Tanaka ..................... C21D 1/70
                                                           148/113

(Continued)

FOREIGN PATENT DOCUMENTS

CN    101535182 B    2/2012
JP    200026980 A    1/2000
(Continued)

OTHER PUBLICATIONS

English Translation of JP 2007-023329 provided by the ESpace website, internet retrival date of Apr. 4, 2016.*
(Continued)

*Primary Examiner* — Xiaobei Wang
(74) *Attorney, Agent, or Firm* — The Webb Law Firm

(57) ABSTRACT

A solution for forming an insulation coating of grain-oriented electrical steel sheet includes an aqueous solution prepared by mixing a phosphate solution and colloidal silica. Chromium is not added to the aqueous solution. The colloidal silica includes silica particles surface-modified by an aluminate or is prepared by adding an aluminate to colloidal silica such as conventional colloidal silica.

14 Claims, 6 Drawing Sheets

(51) Int. Cl.
| | |
|---|---|
| C23C 22/20 | (2006.01) |
| C23C 22/22 | (2006.01) |
| H01F 1/18 | (2006.01) |
| C04B 14/06 | (2006.01) |
| C23C 22/74 | (2006.01) |
| C23C 22/08 | (2006.01) |
| C21D 8/12 | (2006.01) |
| C04B 111/00 | (2006.01) |

(52) U.S. Cl.
CPC .............. *C23C 22/18* (2013.01); *C23C 22/20* (2013.01); *C23C 22/22* (2013.01); *C23C 22/74* (2013.01); *H01F 1/18* (2013.01); *C04B 2111/00525* (2013.01); *Y10T 428/249969* (2015.04)

(56) References Cited

U.S. PATENT DOCUMENTS

| | | | | |
|---|---|---|---|---|
| 3,948,786 | A | * | 4/1976 | Evans ..................... C23C 22/74 106/286.5 |
| 3,985,583 | A | * | 10/1976 | Shimanaka .............. C09D 1/00 148/245 |
| 4,036,721 | A | * | 7/1977 | Kato ....................... C25D 13/20 204/486 |
| 9,206,321 | B2 | | 12/2015 | Yamaguchi |
| 2002/0098345 | A1 | * | 7/2002 | Kamo ..................... C09D 5/084 428/336 |
| 2003/0136470 | A1 | * | 7/2003 | Takashima ........... C21D 8/1288 148/113 |
| 2003/0152763 | A1 | * | 8/2003 | Zhang ................... C03C 17/007 428/325 |
| 2009/0208764 | A1 | * | 8/2009 | Tanaka ................... C23C 22/08 428/472.2 |
| 2010/0206437 | A1 | | 8/2010 | Takashima et al. |
| 2011/0039122 | A1 | | 2/2011 | Holzapfel et al. |

FOREIGN PATENT DOCUMENTS

| | | | |
|---|---|---|---|
| JP | 200034579 A | 2/2000 | |
| JP | 200034580 A | 2/2000 | |
| JP | 2004346348 A | 12/2004 | |
| JP | 2007-023329 | * 2/2007 | ............ C23C 22/00 |
| JP | 2007217758 A | 8/2007 | |
| JP | 2013249528 A | 12/2013 | |
| KR | 100215678 B1 | 8/1999 | |
| WO | 9216322 A2 | 10/1992 | |
| WO | 2009028726 A1 | 3/2009 | |

OTHER PUBLICATIONS

"LUDOX® Colloidal Silica in Coatings Lithium Polysilicate in Coatings", Grace Davison Engineered Materials, Technical Information,, copyright 2007, 6 pages, retrieved from https://grace.com/coatings-and-inks/en-us/Documents/LUDOX%20Coatings%20TI.pdf.*

P. Anderson "Measurement of the stress sensitivity of magnetostriction in electrical steels under distorted waveform conditions," Journal of Magnetism and Magnetic Materials, 2008, e583-e588, vol. 320.

R.K. Iler "The Effect of Surface Aluminosilicate Ions on the Properties of Colloidal Silica," Journal of Colloid and Interface Science, 1976, pp. 25-34, vol. 55, No. 1.

S.-P. Szu, L.C. Klein, M. Greenblatt, "Effect of precursors on the structure of phosphosilicate gels: 29Si and 31P MAS-NMR study," Journal of Non-Crystalline Solids, 1992, pp. 21-30, vol. 143.

Snowtex Colloidal Silica Technical Bulletin, Nissan Chemical Industries, Ltd., 1999.

Fayon et al., "31P NMR Study of Magnesium Phosphate Glasses", Journal of Non-Crystalline Solids, 2001, pp. 88-94, vol. 283.

Zhang et al., "Sol-gel Synthesis of Al2O3—P2O5 Glasses; Mechanistic Studies by Solution and Solid State NMR", Journal of Materials Chemistry, 2004, pp. 1605-1615, vol. 14.

* cited by examiner

FIG. 6
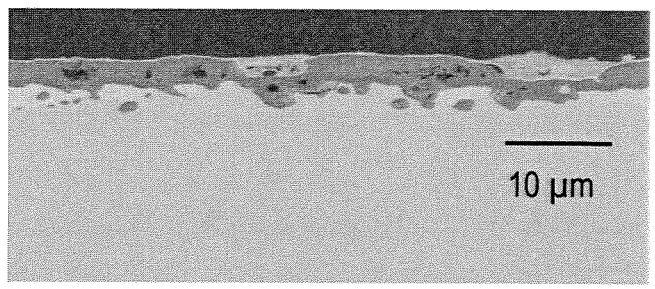
FIG. 7
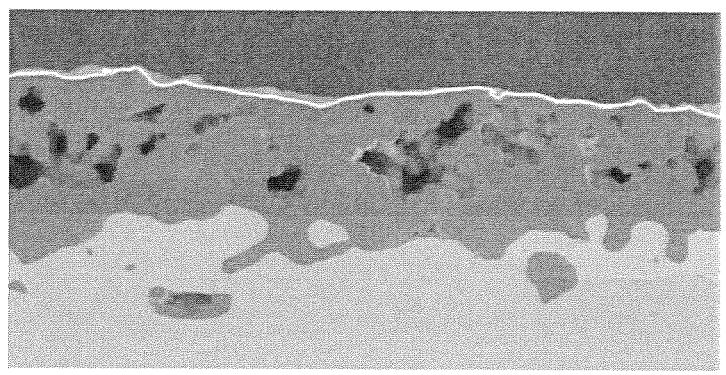

SOLUTION FOR FORMING INSULATION COATING AND GRAIN-ORIENTED ELECTRICAL STEEL SHEET

CROSS-REFERENCE TO RELATED APPLICATIONS

This application is the United States national phase of International Application No. PCT/EP2013/060874 filed May 27, 2013, and claims priority to European Patent Application No. 13154543.6 filed Feb. 8, 2013, the disclosures of which are hereby incorporated in their entirety by reference.

BACKGROUND OF THE INVENTION

Field of the Invention

The present invention relates to a solution for forming an insulation coating of grain-oriented electrical steel sheet and a grain-oriented electrical steel sheet having an insulation coating which is formed using the solution.

Description of Related Art

The grain-oriented electrical steel sheet is a ferromagnetic iron material in the shape of strip with a usual thickness of 0.15 to 0.50 mm. At the surface of the grain-oriented electrical steel sheet, an insulation coating is formed. The grain-oriented electrical steel sheet is used as a core material in electrical apparatus such as a transformer and a motor.

The magnetic properties of the grain-oriented electrical steel sheet are achieved by forming a special texture, called Goss texture, so that the direction of easy magnetization is substantially the rolling direction. The texture is obtained by cold rolling and annealing steps.

Besides the texture, the domain structure has an influence on the magnetic properties. That is, the magnetic properties are improved by physical effects in such a way that the energy loss (core loss) caused by reversal of magnetization is minimized. Therefore, in a domain control method, a focused laser beam is scanned on the insulation coating substantially in the width direction of the grain-oriented electrical steel sheet in order to refine the domain structure.

Furthermore, as disclosed in Non-Patent Document 1, for example, a high tension imparted to the base material of the grain-oriented electrical steel sheet leads to improved core loss and magnetostriction. The insulation coating imparts the tension to the base material (steel sheet) by forming the insulation coating at the surface at a high temperature using a material having a smaller coefficient of thermal expansion than that of the steel sheet, and thereby the core loss is improved.

The formed insulation film has the following three functions: (1) electric insulation of the steel sheet, (2) imparting a tensile stress (tension) to the steel sheet, and (3) leading to chemical and thermal resistivity.

For example, Patent Document 1 discloses a solution including a phosphate, colloidal silica, water, and chromium trioxide or chromic acid as a solution for forming the insulation coating. The solution is applied to the surface of a steel sheet and the solution is baked in a temperature range of, for example, 840 to 920° C., and thereby an insulation coating (phosphate/silica layer) is formed at the surface.

Cr(VI) compounds such as chromium trioxide and chromic acid have the following advantages with respect to the formed insulation coating: (i) improvement of the corrosion resistivity, (ii) increase of the chemical resistivity against water, and (iii) avoidance of gas bubbles during the formation of the insulation coating. Therefore, Cr(VI) compounds improve the properties of the insulation coating.

However, recently, use of Cr(VI) compounds has been restricted more strictly because Cr(VI) compounds are toxic and cancerogen. On the other hand, if the Cr(VI) compounds are simply omitted from the solution, many voids are formed in the formed insulation coating, and thereby the insulation coating having sufficient properties cannot be obtained.

DOCUMENT

Patent Document

[Patent Document 1] U.S. Pat. No. 3,856,568

Non-Patent Document

[Non-Patent Document 1] P. Anderson, "Measurement of the stress sensitivity of magnetostriction in electrical steels under distorted waveform conditions," Journal of Magnetism and Magnetic Materials, 320(2008), e583-e588.

SUMMARY OF THE INVENTION

Problems to be Solved by the Invention

Accordingly, a solution which allows a dense insulation coating to be formed without adding Cr(VI) compounds to the solution has been needed.

Methods for Solving the Problem

The inventors have found that a dense insulation coating is obtained by using colloidal silica including silica particles surface-modified by aluminate or colloidal silica to which an aluminate is added, instead of conventional colloidal silica, as a result of studying based on experiments. The present invention is based on this finding.

(1) A solution for forming an insulation coating of grain-oriented electrical steel sheet according to an aspect of the present invention includes an aqueous solution prepared by mixing a phosphate solution and colloidal silica, wherein silica particles of the colloidal silica are surface-modified by aluminate or a solution of the colloidal silica includes aluminate, and the aqueous solution is free of chromium.

(2) In the solution for forming the insulation coating according to (1), the phosphate solution may include one or more selected from aluminum phosphate, magnesium phosphate, nickel phosphate, and manganese phosphate.

(3) In the solution for forming the insulation coating according to (1) or (2), the amount of the phosphate solution may be 25-75 mass % and the amount of the colloidal silica may be 75-25 mass % of the total solid mass when the amounts of the phosphate solution and the colloidal silica are calculated in anhydrous form.

(4) A grain-oriented electrical steel sheet according to an aspect of the present invention includes an insulation coating which is formed by using the solution for forming the insulation coating according to any one of (1)-(3).

(5) In the grain-oriented electrical steel sheet according to (4), the area fraction of voids in a cross section of the insulation coating may be less than 10%.

(6) In the grain-oriented electrical steel sheet according to (4), the insulation coating may include a chemical structure of phosphorus so that the $^{31}P$ nuclear magnetic resonance spectrum of the insulation coating shows a $^{31}$P chemical shift around −35 ppm when the $^{31}$P chemical shift is referenced to an 85 mass % $H_3PO_4$ solution.

(7) In the grain-oriented electrical steel sheet according to (6), the peak area of the $^{31}$P chemical shift around −35 ppm may be more than 30% of the total peak area when the peak area of the $^{31}$P chemical shift around −35 ppm and the total peak area are calculated with a Gaussian fitting in which a peak position is determined in a range of 0 to −60 ppm.

Effects of the Invention

According to the solution for forming the insulation coating according to the aspect of the present invention, even if a Cr(VI) compound is not added to the solution, a dense insulation coating can be formed because the solution includes colloidal silica including silica particles surface-modified by an aluminate or colloidal silica to which an aluminate is added.

The grain-oriented electrical steel sheet according to the aspect of the present invention has excellent magnetic properties due to a high tension imparted to a steel sheet as well as excellent electric insulation, thermal resistivity, chemical resistivity, and chemical safety because the grain-oriented electrical steel sheet has a dense insulation coating which is formed by using the solution for forming the insulation coating according to the above aspect of the present invention.

BRIEF DESCRIPTION OF THE DRAWINGS

FIG. 6 is a flowchart showing the evaluation procedure of the porosity.

FIG. 7 is a cross-sectional image of an insulation coating of Example No. 22 (comparative example).

DETAILED DESCRIPTION OF THE INVENTION

Hereinafter, embodiments of the present invention will be described with reference to the accompanying drawings.

A solution for forming an insulation coating according to an embodiment of the present invention includes a mixture of colloidal silica, a phosphate such as metal phosphate, and water. Chromium is not added to the solution. In addition, colloidal silica including silica (silica particles) surface-modified by an aluminate or colloidal silica to which an aluminate is added is used as the colloidal silica.

Figure 1:
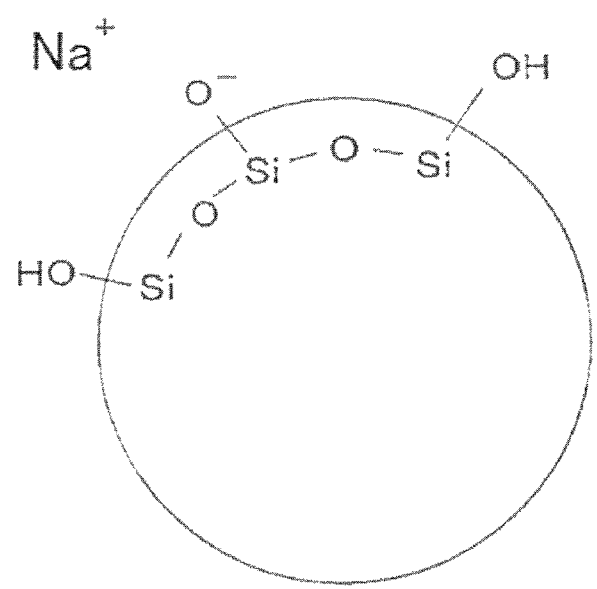
FIG. 1 is a schematic illustration of conventional colloidal silica.
Figure 2:
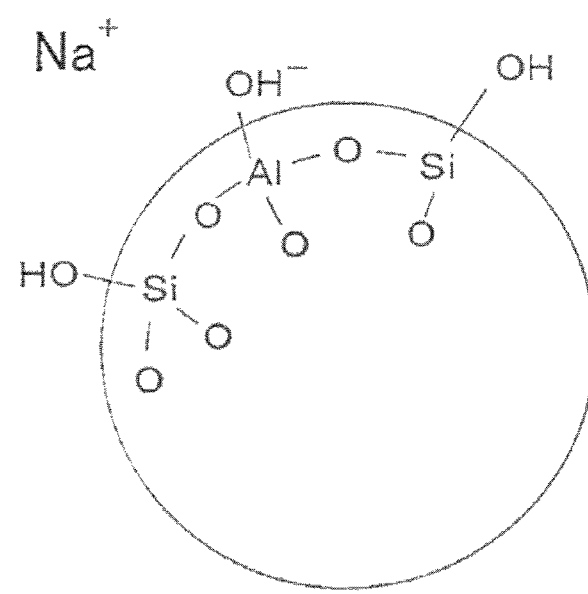
FIG. 2 is a schematic illustration of colloidal silica in a solution for forming an insulation coating according to an embodiment of the present invention.

FIG. 1 shows a schematic illustration of conventional common colloidal silica and FIG. 2 shows a schematic illustration of colloidal silica including silica surface-modified by an aluminate.

The conventional colloidal silica is stabilized by an aqueous solution including $Na^+$, and Si—O$^-$ is arranged at the surface of the conventional colloidal silica. On the other hand, colloidal silica including silica surface-modified by an aluminate is more stable than the conventional colloidal silica because Al—OH$^-$ is arranged at the surface of the silica particles. For example, the mechanism of stabilization is described in R. K. Iler, "The Effect of Surface Aluminosilicate Ions on the Properties of Colloidal Silica," Journal of Colloidal and Interface Science, vol. 55, No. 1, p 25-34. In addition, for example, U.S. Pat. No. 2,892,797 discloses a process for modifying the properties of a silica sol using a surface modification.

The inventors have found by experiment that the formed insulation coating has a dense structure when colloidal silica including silica surface-modified by an aluminate is used in the solution for forming the insulation coating. Even when an aluminate is added to colloidal silica, the colloidal silica including the aluminate produces a similar effect to colloidal silica including the surface-modified silica. The amount of the aluminate is not limited in the colloidal silica, and may be 0.1-10 mass % of the total amount of the colloidal silica (the solution of colloidal silica), for example.

Therefore, in the solution for forming the insulation coating according to the embodiment, colloidal silica including silica surface-modified by an aluminate or colloidal silica to which an aluminate is added is used.

The solution for forming the insulation coating according to the embodiment has a composition of 25 to 75 mass % of phosphate and 75 to 25 mass % of colloidal silica when the amounts of the phosphate and the colloidal silica are calculated in solid (anhydrous) form. One selected from aluminum phosphate, magnesium phosphate, nickel phosphate, and manganese phosphate, or mixture of two or more selected from the above-mentioned phosphates can be used as the phosphate.

Figure 3:
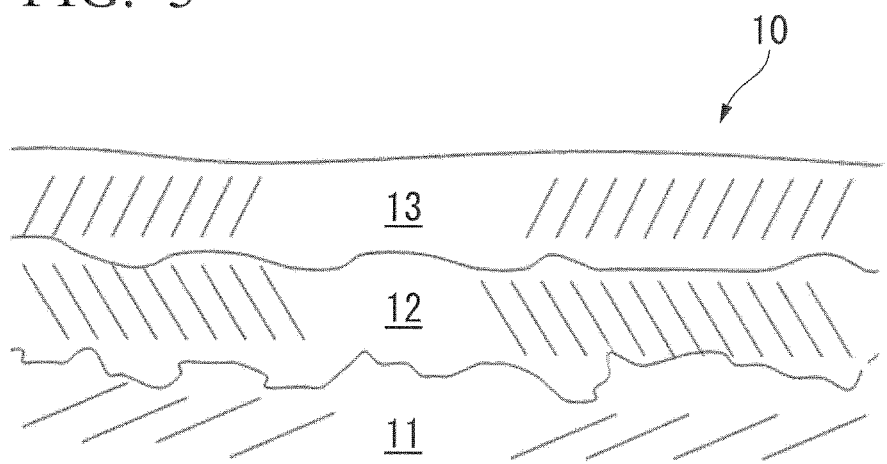
FIG. 3 is a cross-sectional illustration of a grain-oriented electrical steel sheet according to an embodiment of the present invention.

Furthermore, a grain-oriented electrical steel sheet according to an embodiment of the present invention will be described in reference to FIG. 3. The grain-oriented electrical steel sheet 10 shown in FIG. 3 includes a base material 11, a glass film 12 formed on the surface of the base material 11, and an insulation coating 13 formed on the surface of the glass film 12. When the glass film 12 is not formed, the insulation coating 13 is formed on the surface of the base material 11.

The thickness of the base material 11 is generally 0.15-0.50 mm.

The glass film 12 includes a composite oxide such as forsterite ($Mg_2SiO_4$), spinel ($MgAl_2O_4$), and cordierite ($Mg_2Al_4Si_5O_{16}$).

The insulation coating 13 is formed by applying and baking the solution for forming the insulation coating according to the above-mentioned embodiment. For example, in the embodiment, the thickness of the insulation coating may be 0.5 to 5 μm.

The insulation coating 13 has a dense structure, and, for example, the area fraction of voids may be 0.1 or less (10% or less) in a cross section of the insulation coating 13.

The insulation coating 13 may show a characteristic peak or shoulder between −30 and −40 ppm of a chemical shift relative to a $H_3PO_4$ solution in a $^{31}$P nuclear magnetic resonance (NMR) spectrum. For example, the insulation coating 13 is free from chromium and may include a chemical structure of phosphorous so that the $^{31}$P NMR spectrum of the insulation coating 13 shows a $^{31}$P chemical shift around −35 ppm when the $^{31}$P chemical shift is referenced to an 85 mass % $H_3PO_4$ solution. The peak area of the $^{31}$P chemical shift around −35 ppm is more than 30% of the total peak area when the peak area of the $^{31}$P chemical shift around −35 ppm and the total peak area are calculated with a Gaussian fitting in which each peak position is determined in a range of 0 to −60 ppm.

These features in the chromium-free insulation coating 13 are derived from forming by the solution for forming the insulation coating according to the embodiment. The chromium-free insulation coating 13 can be formed by using a solution to which chromium is not added substantially. Specifically, it is preferable that the amount of chromium is limited within the range in which chromium is not identified by a chemical analysis or GDOES (Glow Discharge Optical Emission Spectroscopy) in the insulation coating 13 and the solution for forming the insulation coating (for example, 0.1 mass % or less).

An example of method for producing the grain-oriented electrical steel sheet 10 according to the embodiment will be described.

Figure 4:
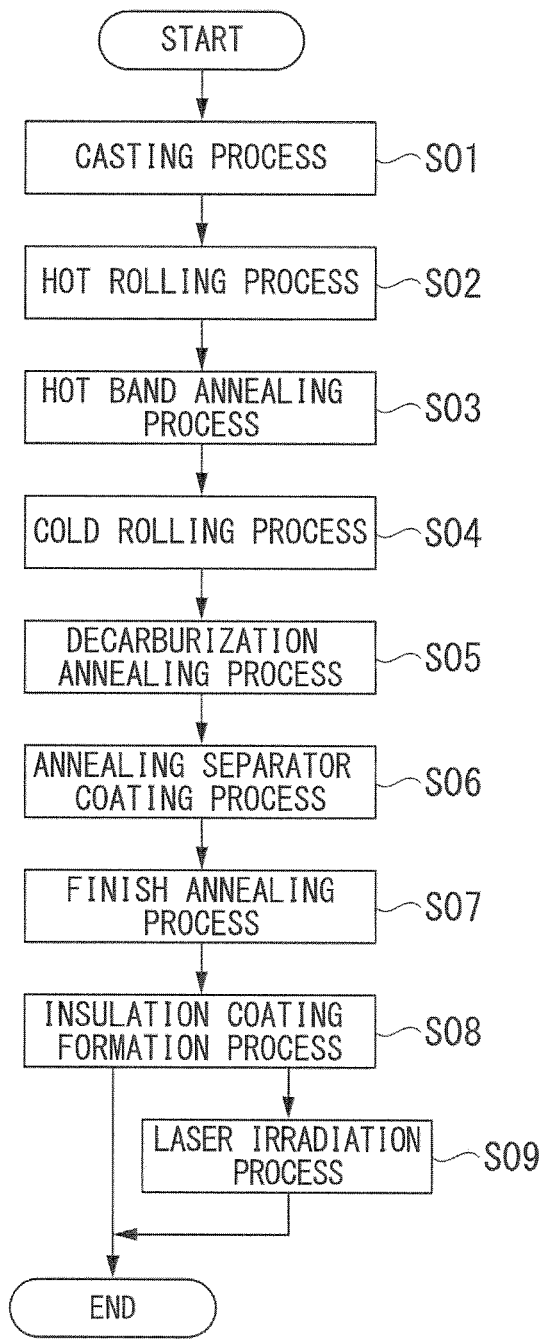
FIG. 4 is a flowchart of a method for producing the grain-oriented electrical steel sheet according to the embodiment.

As shown in the flowchart of FIG. 4, the method for the grain-oriented electrical steel sheet 10 according to the embodiment includes a casting process S01, a hot-rolling process S02, a hot-band annealing process S03, a cold-rolling process S04, a decarburization annealing process S05, an annealing separator coating process S06, a finish annealing process S07, an insulation coating formation process S08, and optionally a laser irradiation process S09.

In the embodiment, for example, the iron alloy (starting material) has a composition of Si: 2.5-4.0 mass %, C: 0.02-0.10 mass %, Mn: 0.05-0.30 mass %, acid-soluble Al: 0.020-0.040 mass %, N: 0.002-0.012 mass %, S: 0.001-0.040 mass %, and the balance of Fe and inevitable impurities. In the casting process S01, a slab is continuously manufactured by supplying molten steel prepared so as to have the above-mentioned composition to a continuous casting machine.

In the hot-rolling process S02, the obtained slab is heated at a predetermined temperature (for example, 1150-1400° C.), and then hot rolling is performed. As a result, a hot-rolled sheet having a thickness of, for example, 1.8-3.5 mm is manufactured.

In the hot-band annealing process S03, the hot-rolled sheet is subjected to a heat treatment under a condition of 750-1200° C. for 30 seconds to 10 minutes for example.

In the cold-rolling process S04, after the hot-band annealing process S03, the surface of the hot-rolled sheet is pickled, and then cold rolling is performed. As a result, a cold-rolled sheet having a thickness of, for example, 0.15-0.50 mm is manufactured.

In the decarburization annealing process S05, the cold-rolled sheet is subjected to a heat treatment under a condition of 700-900° C. for 1-3 minutes for example. As a result, a decarburization annealed sheet is manufactured. At the surface of the decarburization annealed sheet, an oxide layer mainly including silica ($SiO_2$) is formed by the decarburization annealing process S05. In the heat treatment (during decarburization or after decarburization), the cold-rolled sheet may be nitride according to the necessity.

In the annealing separator coating process S06, an annealing separator is applied to the oxide layer. The annealing separator may mainly include magnesia (MgO).

In the finish annealing process S07, the decarburization annealed sheet coated with the annealing separator is coiled, and the obtained coil is put in a furnace such as a butch-type furnace, and then a heat treatment is performed. As a result, a base material 11 is manufactured. For example, the heat treatment condition in the finish annealing process S07 may be in 1100-1300° C. for 20-24 hours. In the finish annealing process S07, the oxide layer mainly including silica reacts with the annealing separator mainly including magnesia, and thereby a glass film 12 mainly including forsterite ($Mg_2SiO_4$) is formed on the surface of base material 11.

In the insulation coating formation process S08, the solution for forming the insulation coating according to the embodiment is applied to the glass film 12 formed on the surface of the base material 11, then baking is performed, and thereby an insulation coating 13 is formed.

In the insulation coating formation process S08, the amount of the formed insulation coating may be in a range of 1-10 g/m$^2$. The baking temperature may be in a range of 750-1000° C.

When the amount of the insulation coating is 1 g/m$^2$ or more, the obtained insulation coating can impart a sufficient tension to the base material 11. On the other hand, when the amount of the insulation coating is 10 g/m$^2$ or less, the sufficient occupation ratio of iron is secured so as to obtain sufficient magnetic properties. Therefore, in the embodiment, the amount of the insulation coating may be in a range of 1-10 g/m$^2$.

When the baking temperature is 750° C. or higher, the sufficient difference in coefficient of thermal expansion is secured between the base material 11 and the insulation coating 13, and thereby the formed insulation coating 13 can impart a sufficient tension to the base material 11. On the other hand, when the baking temperature is 1000° C. or higher, the imparted tension is not further improved and the manufacturing cost increases. Therefore, in the embodiment, the baking temperature may be in a range of 750-1000° C.

The laser irradiation process S09 is performed in order to reduce the core loss of a grain-oriented electrical steel sheet 10, if necessary. In the laser irradiation process S09, a laser beam is scanned substantially in the width direction of the grain-oriented electrical steel sheet while focusing and irradiating the laser beam on the insulation coating 13. By the laser scanning, linear strains substantially perpendicular to the rolling direction are applied to the surface of the base material 11 at a predetermined interval in respect to the rolling direction. The light source and type of the laser are not limited as long as the laser irradiation is performed using a laser light source used for typical domain control. In the laser irradiation process S09 of the embodiment, YAG laser is used.

As described above, a grain-oriented electrical steel sheet 10 can be produced in which the glass film 12 and insulation coating 13 are formed on the base material 11 and the domain is controlled by the laser irradiation.

In the solution for forming the insulation coating according the embodiment having the above-mentioned configuration, since the solution includes an aqueous solution prepared by mixing a phosphate solution and colloidal silica, and silica particles of the colloidal silica are surface-modified by an aluminate or a solution of the colloidal silica includes aluminate, the dense insulation coating 13 can be obtained, and a chromium (VI) compound does not have to be added to the solution.

In addition, in the embodiment, when one or more selected from aluminum phosphate, magnesium phosphate, nickel phosphate, and manganese phosphate is used as a phosphate, a dense insulation coating 13 can be formed more reliably.

Furthermore, in the embodiment, when the solution includes 25 to 75 mass % of phosphate and 75 to 25 mass % of colloidal silica on the anhydrous basis, a dense insulation coating 13 can be formed by applying and baking the solution on the glass film 11.

Because the grain-oriented electrical steel sheet 10 according to the embodiment has an insulation coating 13 formed by the solution for forming the insulation coating according to the embodiment, the grain-oriented electrical steel sheet 10 has excellent electric insulation, thermal resistivity, and chemical resistivity, and the insulation coating 13 can impart a high tension to the base material 11. Accordingly, the grain-oriented electrical steel sheet 10 has excellent magnetic properties and is preferably used as a material of a core of a transformer or the like.

In the embodiment, when the area fraction of voids is less than 10% in a cross section of the insulation coating 13, a dense structure is secured in the insulation coating 13, and thereby the grain-oriented electrical steel sheet 10 has excellent electric insulation, thermal resistivity, and chemical resistivity.

In the embodiment, the insulation coating 13 may include a chemical structure of phosphorous so that the $^{31}P$ NMR spectrum of the insulation coating shows a $^{31}P$ chemical shift around −35 ppm when the $^{31}P$ chemical shift is referenced to an 85 mass % $H_3PO_4$ solution. For example, the $^{31}P$ chemical shift around −35 ppm may be easily identified by a characteristic peak having a peak position between −30 and −40 ppm (in a narrower range, between −32 and −38 ppm or between −33 and −37 ppm) or shoulder between −30 and −40 ppm. More specifically, the $^{31}P$ chemical shift around −35 ppm can be identified by a Gaussian curve having a peak position around −35 ppm (for example, between −30 and −40 ppm, between −32 and −38 ppm, or between −33 and −37 ppm) when the Gaussian curve is obtained by Gaussian fitting with a single Gaussian curve or peak deconvolution (Gaussian fitting) with a plurality of Gaussian curves, each having a different peak position (for example, by 1 ppm or more). Thus, a $^{31}P$ chemical shift having another peak position may be obtained by the peak deconvolution. Furthermore, the peak area of the $^{31}P$ chemical shift around −35 ppm may be more than 30% of the total peak area when the peak area of the $^{31}P$ chemical shift around −35 ppm and the total peak area are calculated with the above-mentioned Gaussian fitting in which each peak position is determined in a range of 0 to −60 ppm. That is, the peak area of each $^{31}P$ chemical shift is determined by the area of the corresponding Gaussian curve.

With these features, when the insulation coating 13 does not include chromium, the insulation coating 13 can be identified as a coating formed by the solution for forming the insulation coating according to the embodiment.

In the insulation coating formation process S08 of the embodiment, the amount of the insulation coating may be in a range of 1-10 g/m$^2$, and the baking temperature may be in a range of 750-1000° C. As a result, the obtained insulation coating 13 can impart a sufficient tension to the base material 11 while securing an occupation ratio of iron, and a grain-oriented electrical steel sheet 10 having excellent magnetic properties can be provided.

As described above, the preferred embodiments of the present invention are described. However, the present invention is not limited to the embodiments. Various modifications or alterations can be applied within a scope in respect to the technical idea of the present invention.

For example, the compositions of the base material 11 (steel sheet) and glass film 12 are not limited to those in the embodiment, and the insulation coating may be formed using another compositions of base material (steel sheet) and glass film.

Examples

Tests which were performed in order to confirm the effects of the present invention will be described below.

As shown in Table 1, various compositions of solutions for forming insulation coatings (Solution Nos. 1 to 19) were prepared using metal phosphate solutions having a concentration of 50 mass % and colloidal silica having a concentration of 30 mass %. In the Solution No. 17, an aluminate was added to conventional colloidal silica so as to obtain a mixture (colloidal silica) including 3 mass % of aluminate. In addition, two products (A and B) provided from two different suppliers were used as colloidal silica including silica surface-modified by an aluminate.

[Table 1]

(Stability of Solution)

Figure 5:
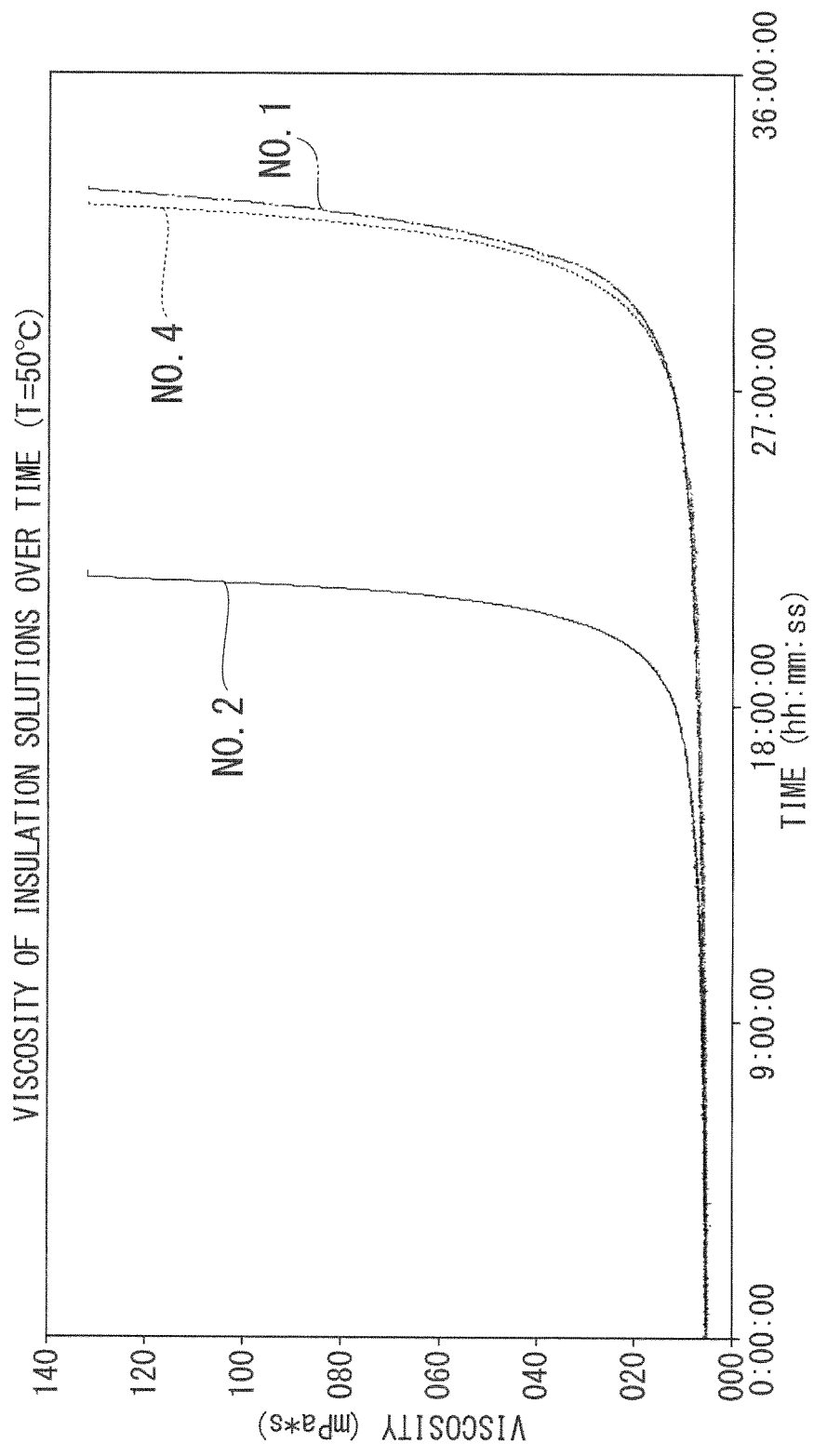
FIG. 5 is a graph showing the evaluation results of stability of solutions for forming insulation coatings.

Solution No. 1 including a chromic acid, Solution No. 2 in which conventional colloidal silica was used without a chromic acid, Solution No. 4 in which colloidal silica including silica (silica particles) surface-modified by an aluminate was used without a chromic acid were prepared, then these solutions were held at 50° C., and thereby the relationship between the holding time and viscosity was evaluated. The results obtained by the evaluations were shown in FIG. 5. The viscosities were measured by the rotational viscometer of Brookfield DV-II+ (spindle: LV1, drive: 50 rpm).

In the Solution No. 2 in which the conventional colloidal silica was used without a chromic acid, the viscosity was changed abruptly after 20 hours. On the other hand, in the Solution No. 4 in which colloidal silica including the silica surface-modified by the aluminate was used without a chromic acid, the viscosity change over time was similar to that in Solution No. 1 including the chromic acid. The results show that a solution including the silica surface-modified by an aluminate has an excellent stability even if a chromic acid is not added to the solution.

(Evaluation of Insulation Coating)

The Solution Nos. 1 to 19 were applied to steel sheets, and then were baked. Thereby, insulation coatings of Example Nos. 11 to 191 were formed as shown in Table 2. In these cases, the amounts of the applied solution were all 4.5 g/m$^2$. The baking temperatures were in the range of 830-930° C., as shown in Tables 2 and 3.

Porosity (area fraction of voids) F in a cross section of an insulation coating was evaluated as follows. As shown in FIG. 6, a cross-sectional image of the insulation coating was obtained by back-scattered electron.

The image was binarized, and the cross-sectional area except void area $A_c$ was obtained from the binary image ($A_c$=197 μm$^2$ in the example of FIG. 6).

Then, the cross-sectional area including void area A was obtained from the void-filling binary image (A=260 μm$^2$ in the example of FIG. 6).

Accordingly, the porosity F was calculated from F=1−$A_c$/A (F=1−197/260=24.1% in the example of FIG. 6).

In each insulation coating of the examples, 5 images were obtained by the observation at a magnification of 5000, and then the average value of the obtained porosities was calculated.

The tension imparted by the insulation coating was evaluated. The curvature of a sample was measured before and after a one-side coating, and then the imparted tension was calculated from the difference between the curvatures. The imparted tensions of the insulation coatings of Example Nos. 11-191 are shown in Tables 2 and 3.

[Table 2]
[Table 3]

As shown in Tables 2 and 3, in the Example Nos. 21 to 23, because insulation coatings were formed by the solutions in which conventional colloidal silica was used without a chromic acid, the porosities were very high (15% or higher). On the other hand, in the Example Nos. 41 to 93, 111 to 163, 181, and 191, because insulation coatings were formed by the solutions in which colloidal silica including silica surface-modified by an aluminate was used, the porosities were less than 10%, and the Example Nos. had denser structure than those of the above-mentioned Example Nos. in which insulation coatings were formed by the solutions including the conventional colloidal silica without a chromic acid or an aluminate. In addition, in the Example Nos. 171 to 173, because insulation coatings were formed by the solutions in which an aluminate was added to the conventional colloidal silica, the porosities were less than 10%.

Figure 8:
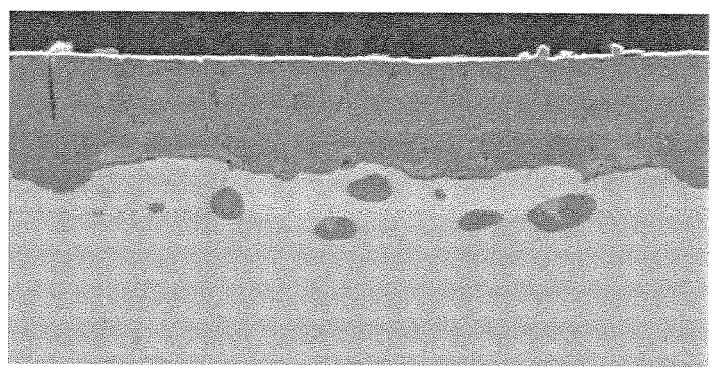
FIG. 8 is a cross-sectional image of an insulation coating of Example No. 42 (inventive example).

Here, FIG. 7 shows a cross-sectional image of the insulation coating which was formed by the solution including a chromic acid in the Example No. 22, and FIG. 8 shows a cross-sectional image of the insulation coating which was formed by the solution in which colloidal silica including silica surface-modified by an aluminate was used in the Example 42.

Many voids were observed in the insulation coating of Example No. 22, but few voids were observed and the dense structure was obtained in the insulation coating of Example No. 42.

Tables 2 and 3 show the relationship between the porosity and the imparted tension. As shown in Tables 2 and 3, as the porosity decreased, the imparted tension increased.

As a result of the evaluation of the tension, in the Example Nos. 11 to 13, 31 to 33, and 101 to 103 in which a chromic acid was used, the insulation coatings imparted high tension to the steel sheets. In the Example Nos. 41 to 93, 111 to 163, 181, and 191 in which colloidal silica including silica surface-modified by an aluminate was used, and the Example Nos. 171 to 173 in which an aluminate was added to the conventional colloidal silica, imparted tensions are similarly high, whereas in Examples Nos. 21 to 23 where conventional silica without chromic acid was used, imparted tensions are clearly lower.

(Nuclear Magnetic Resonance Spectroscopy)

The chemical structures of insulation coatings were evaluated by $^{31}$P nuclear magnetic resonance (NMR) spectroscopy in the Example No. 12 in which a chromic acid and conventional colloidal silica were used, the Example No. 22 in which conventional colloidal silica was used without a chromic acid, and the Example No. 42 in which colloidal silica including silica surface-modified by an aluminate was used.

The insulation coatings were sampled by using 10% Br-methanol solution, and $^{31}$P NMR spectra were obtained for the three sampled insulation coatings. The chemical shifts of $^{31}$P NMR spectra were referenced to an 85 mass % $H_3PO_4$ solution.

Figure 9:
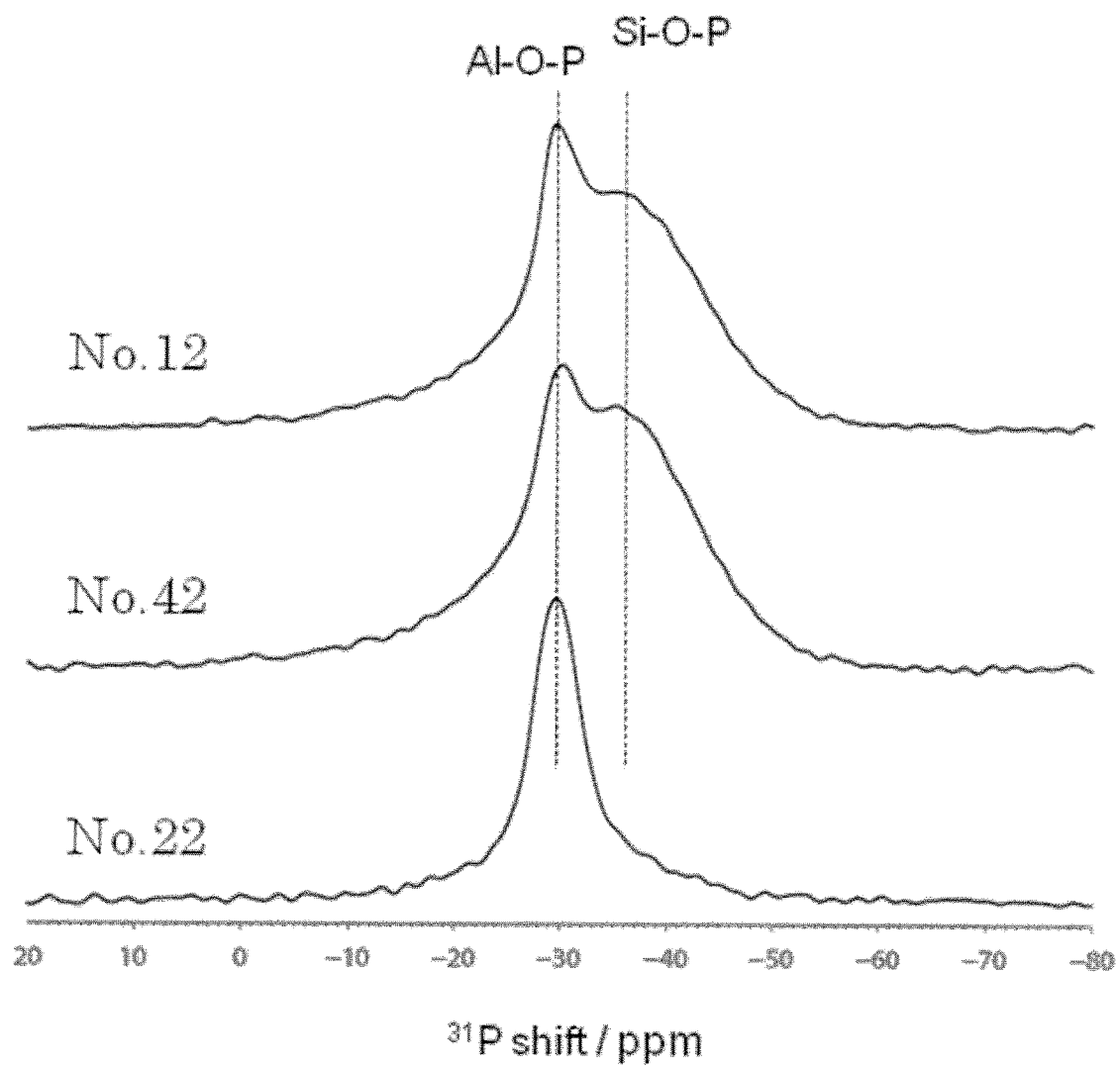
FIG. 9 is $^{31}$P magic angle spinning nuclear magnetic resonance spectra of insulation coatings of grain-oriented electrical steel sheets.

In FIG. 9, $^{31}$P magic angle spinning NMR spectra of the insulation coatings of Example Nos. 12 and 42 showed two signals at −30 ppm with a relatively sharp peak and at −35 ppm with a very broad peak. The signal at −30 ppm was assigned to phosphorus with Al—O—P linkages. The signal at −35 ppm which is shifted to lower frequency relative to −30 ppm was assigned to phosphorus with Si—O—P linkages. The previous reports (for example, S.-P. Szu, L. C. Klein, M. Greenblatt, J. Non-Cryst. Solids, 143 (1992) 21-30.) support these assignments. Since the peak at −35 ppm is very broad, Si—O—P linkages might have a glassy structure.

The phosphorus with Al—O—P and Si—O—P linkages can be quantified by peak deconvolution with two Gaussian curves having different peak positions (around 30 and 35 ppm) in the insulation coatings of Example Nos. 12 and 42. The peak area ratios of Al—O—P linkages to Si—O—P linkages in the insulation coatings of Example Nos. 12 and 42 were calculated to be 18 to 82 and 15 to 85, respectively. The phosphorus with Si—O—P bonds was found to be dominant species in the insulation coatings of Example Nos. 12 and 42.

On the other hand, a $^{31}$P NMR spectrum of the insulation coating of Example No. 22 showed a main signal at −30 ppm due to Al—O—P linkages and a small amount of the signal due to Si—O—P signal. The peak area ratio of Al—O—P linkages to Si—O—P linkages was calculated to be 75 to 25 by fitting two Gaussian curves. Thus, the main structure of phosphorus was Al—O—P bonds in the insulation coating of Example No. 22. From these results, tension should deteriorate in the insulation coating of Example No. 22 because glassy Si—O—P linkages are difficult to form.

INDUSTRIAL APPLICABILITY

According to the present invention, even if chromium is not added to a coating solution, a dense insulation coating can be formed by using colloidal silica including silica surface-modified by an aluminate or colloidal silica to which an aluminate is added.

REFERENCE SYMBOL LIST

10: grain-oriented electrical steel sheet
11: base material (steel sheet)
12: glass film
13: insulation coating

TABLE 1

| Solution No. | Metal Phosphate(s) (Concentration of 50%) | Colloidal Silica (Concentration of 30%) | $CrO_3$ | Phosphate(s):Silica (Anhydrous Basis) | Type of Example |
|---|---|---|---|---|---|
| 1 | 40% $Al(H_2PO_4)_3$ | 53% Conventional Silica | 7% | 51:49 | Conv. |
| 2 | 43% $Al(H_2PO_4)_3$ | 57% Conventional Silica | — | 51:49 | Comp. |
| 3 | 40% $Al(H_2PO_4)_3$ | 53% Surface-modified Silica B | 7% | 51:49 | Comp. |
| 4 | 43% $Al(H_2PO_4)_3$ | 57% Surface-modified Silica A | — | 51:49 | Inv. |
| 5 | 43% $Al(H_2PO_4)_3$ | 57% Surface-modified Silica B | — | 51:49 | Inv. |
| 6 | 30% $Al(H_2PO_4)_3$ | 70% Surface-modified Silica A | — | 37:63 | Inv. |
| 7 | 30% $Al(H_2PO_4)_3$ | 70% Surface-modified Silica B | — | 37:63 | Inv. |
| 8 | 50% $Al(H_2PO_4)_3$ | 50% Surface-modified Silica A | — | 58:42 | Inv. |
| 9 | 50% $Al(H_2PO_4)_3$ | 50% Surface-modified Silica B | — | 58:42 | Inv. |

TABLE 1-continued

| Solution No. | Metal Phosphate(s) (Concentration of 50%) | Colloidal Silica (Concentration of 30%) | CrO₃ | Phosphate(s):Silica (Anhydrous Basis) | Type of Example |
|---|---|---|---|---|---|
| 10 | 40% Al(H$_2$PO$_4$)$_3$ | 53% Surface-modified Silica A | 7% | 51:49 | Comp. |
| 11 | 22% Al(H$_2$PO$_4$)$_3$ + 21% Mg(H$_2$PO$_4$)$_2$ | 57% Surface-modified Silica A | — | 51:49 | Inv. |
| 12 | 22% Al(H$_2$PO$_4$)$_3$ + 21% Ni(H$_2$PO$_4$)$_2$ | 57% Surface-modified Silica A | — | 51:49 | Inv. |
| 13 | 22% Al(H$_2$PO$_4$)$_3$ + 21% Mn(H$_2$PO$_4$)$_2$ | 57% Surface-modified Silica A | — | 51:49 | Inv. |
| 14 | 43% Mg(H$_2$PO$_4$)$_2$ | 57% Surface-modified Silica A | — | 51:49 | Inv. |
| 15 | 43% Ni(H$_2$PO$_4$)$_2$ | 57% Surface-modified Silica A | — | 52:48 | Inv. |
| 16 | 43% Mn(H$_2$PO$_4$)$_2$ | 57% Surface-modified Silica A | — | 52:48 | Inv. |
| 17 | 43% Al(H$_2$PO$_4$)$_3$ | 57% Conventional Silica (incl. 3% aluminate added) | — | 51:49 | Inv. |
| 18 | 16% Al(H$_2$PO$_4$)$_3$ | 84% Surface-modified Silica A | — | 21:79 | Inv. |
| 19 | 71% Al(H$_2$PO$_4$)$_3$ | 29% Surface-modified Silica A | — | 78:22 | Inv. |

Inv.: Inventive Example,
Comp.: Comparative Example,
Conv.: Conventional Example

TABLE 2

| Example No. | Solution No. | Baking Temp. | Porosity, F. | Peak Area Ratio Al—O—P:Si—O—P | Imparted Tension (MPa) | Type of Example |
|---|---|---|---|---|---|---|
| 11 | 1 | 830° C. | 0% | 25:75 | 7.1 | Conv. |
| 12 | 1 | 850° C. | 2% | 18:82 | 7.3 | Conv. |
| 13 | 1 | 930° C. | 2% | 20:80 | 7.3 | Conv. |
| 21 | 2 | 830° C. | 15% | 78:22 | 3.3 | Comp. |
| 22 | 2 | 850° C. | 21% | 75:25 | 3.0 | Comp. |
| 23 | 2 | 930° C. | 32% | 77:23 | 2.8 | Comp. |
| 31 | 3 | 830° C. | 0% | 25:75 | 7.4 | Comp. |
| 32 | 3 | 850° C. | 1% | 23:77 | 7.3 | Comp. |
| 33 | 3 | 930° C. | 2% | 25:75 | 7.1 | Comp. |
| 41 | 4 | 830° C. | 1% | 16:84 | 7.6 | Inv. |
| 42 | 4 | 850° C. | 2% | 15:85 | 7.7 | Inv. |
| 43 | 4 | 930° C. | 3% | 20:80 | 7.3 | Inv. |
| 51 | 5 | 830° C. | 2% | 15:85 | 7.5 | Inv. |
| 52 | 5 | 850° C. | 1% | 15:85 | 7.7 | Inv. |
| 53 | 5 | 930° C. | 2% | 17:83 | 7.4 | Inv. |
| 61 | 6 | 830° C. | 4% | 37:63 | 7.1 | Inv. |
| 62 | 6 | 850° C. | 4% | 45:55 | 6.9 | Inv. |
| 63 | 6 | 930° C. | 4% | 33:67 | 7.0 | Inv. |
| 71 | 7 | 830° C. | 3% | 30:70 | 7.2 | Inv. |
| 72 | 7 | 850° C. | 4% | 42:58 | 6.8 | Inv. |
| 73 | 7 | 930° C. | 4% | 35:65 | 7.0 | Inv. |
| 81 | 8 | 830° C. | 3% | 27:73 | 7.1 | Inv. |
| 82 | 8 | 850° C. | 4% | 30:70 | 7.3 | Inv. |
| 83 | 8 | 930° C. | 4% | 26:74 | 7.0 | Inv. |
| 91 | 9 | 830° C. | 3% | 40:60 | 6.9 | Inv. |
| 92 | 9 | 850° C. | 3% | 28.72 | 7.3 | Inv. |
| 93 | 9 | 930° C. | 3% | 30:70 | 7.2 | Inv. |

Inv.: Inventive Example,
Comp.: Comparative Example,
Conv.: Conventional Example

TABLE 3

| Example No. | Solution No. | Baking Temp. | Porosity, F | Peak Area Ratio Al—O—P:Si—O—P | Imparted Tension (MPa) | Type of Example |
|---|---|---|---|---|---|---|
| 101 | 10 | 830° C. | 2% | 17:83 | 7.5 | Comp. |
| 102 | 10 | 850° C. | 3% | 22:78 | 7.2 | Comp. |
| 103 | 10 | 930° C. | 2% | 25:75 | 7.2 | Comp. |
| 111 | 11 | 830° C. | 1% | 20:80 | 7.5 | Inv. |
| 112 | 11 | 850° C. | 2% | 18:82 | 7.3 | Inv. |
| 113 | 11 | 930° C. | 2% | 22:78 | 7.3 | Inv. |
| 121 | 12 | 830° C. | 3% | 20:80 | 7.4 | Inv. |
| 122 | 12 | 850° C. | 1% | 15:85 | 7.7 | Inv. |
| 123 | 12 | 930° C. | 1% | 18:82 | 7.6 | Inv. |
| 131 | 13 | 830° C. | 2% | 21:79 | 7.4 | Inv. |
| 132 | 13 | 850° C. | 1% | 18:82 | 7.6 | Inv. |
| 133 | 13 | 930° C. | 0% | 16:84 | 7.6 | Inv. |

TABLE 3-continued

| Example No. | Solution No. | Baking Temp. | Porosity, F | Peak Area Ratio Al—O—P:Si—O—P | Imparted Tension (MPa) | Type of Example |
|---|---|---|---|---|---|---|
| 141 | 14 | 830° C. | 2% | 24:76 | 7.3 | Inv. |
| 142 | 14 | 850° C. | 3% | 15:85 | 7.3 | Inv. |
| 143 | 14 | 930° C. | 2% | 19:81 | 7.3 | Inv. |
| 151 | 15 | 830° C. | 2% | 22:78 | 7.4 | Inv. |
| 152 | 15 | 850° C. | 1% | 18:88 | 7.7 | Inv. |
| 153 | 15 | 930° C. | 0% | 20:80 | 7.8 | Inv. |
| 161 | 16 | 830° C. | 1% | 22:78 | 7.4 | Inv. |
| 162 | 16 | 850° C. | 0% | 17:83 | 7.7 | Inv. |
| 163 | 16 | 930° C. | 0% | 15:85 | 7.9 | Inv. |
| 171 | 17 | 830° C. | 4% | 25:75 | 7.0 | Inv. |
| 172 | 17 | 850° C. | 3% | 22:78 | 7.2 | Inv. |
| 173 | 17 | 930° C. | 3% | 23:77 | 7.2 | Inv. |
| 181 | 18 | 850° C. | 8% | 65:35 | 5.8 | Inv. |
| 191 | 19 | 850° C. | 6% | 60:40 | 6.0 | Inv. |

Inv.: Inventive Example,
Comp.: Comparative Example,
Conv.: Conventional Example

What is claimed is:

1. A grain-oriented electrical steel sheet comprising an insulation coating, wherein the insulation coating consists of phosphorous, silicon, oxygen, and at least one selected from Al, Mg, and Mn, the insulation coating is free of chromium, and an area rate of pores in a cross section of the insulation coating is less than 10%.

2. The grain-oriented electrical steel sheet according to claim 1, wherein the insulation coating includes a chemical structure of phosphorus so that a $^{31}$P nuclear magnetic resonance spectrum of the insulation coating shows a $^{31}$P chemical shift at −32 to −38 ppm when the $^{31}$P chemical shift is referenced to an 85 mass % $H_3PO_4$ solution.

3. The grain-oriented electrical steel sheet according to claim 2, wherein a peak area of the $^{31}$P chemical shift at −32 to −38 ppm is more than 30% of a total peak area when the peak area of the $^{31}$P chemical shift at −32 to −38 ppm and the total peak area are calculated with a Gaussian fitting in which a peak position is determined in a range of 0 to −60 ppm.

4. A method for making the grain-oriented electrical steel sheet comprising the insulation coating of claim 1, comprising:
   applying a solution comprising an aqueous solution consisting essentially of a phosphate solution and colloidal silica to at least one surface of the steel sheet,
   and baking the steel sheet at a temperature of 750-1000° C. to form an insulation coating on the at least one surface of the steel sheet,
   wherein silica particles of the colloidal silica are surface-modified by aluminate or a solution of the colloidal silica includes aluminate,
   the aqueous solution is free of chromium, and
   the insulation coating formed by baking the steel sheet has an area fraction of voids in a cross section of the insulation coating is less than 10%.

5. The method for forming the insulation coating on a grain-oriented electrical steel sheet according to claim 4, wherein the phosphate solution includes one or more selected from aluminum phosphate, magnesium phosphate, nickel phosphate, and manganese phosphate.

6. The method for forming the insulation coating on a grain-oriented electrical steel sheet according to claim 5, wherein an amount of the phosphate solution is 25-75 mass % and an amount of the colloidal silica is 75-25 mass % of a total solid mass when the amounts of the phosphate solution and the colloidal silica are calculated in anhydrous form.

7. The method for forming the insulation coating on a grain-oriented electrical steel sheet according to claim 4, wherein an amount of the phosphate solution is 25-75 mass % and an amount of the colloidal silica is 75-25 mass % of a total solid mass when the amounts of the phosphate solution and the colloidal silica are calculated in anhydrous form.

8. A grain-oriented electrical steel sheet comprising an insulation coating formed by:
   applying a solution comprising an aqueous solution consisting essentially of a phosphate solution and colloidal silica to at least one surface of the steel sheet, and baking the steel sheet at a temperature of 750-1000° C. to form an insulation coating on the at least one surface of the steel sheet,
   wherein silica particles of the colloidal silica are surface-modified by aluminate or a solution of the colloidal silica includes aluminate,
   the aqueous solution is free of chromium,
   the phosphate solution consists essentially of one or more selected from aluminum phosphate, magnesium phosphate, and manganese phosphate, and
   the insulation coating consists of phosphorous, silicon, oxygen, and at least one selected from Al, Mg, and Mn.

9. The grain-oriented electrical steel sheet according to claim 8, wherein the insulation coating includes a chemical structure of phosphorus so that a $^{31}$P nuclear magnetic resonance spectrum of the insulation coating shows a $^{31}$P chemical shift at −32 to −38 ppm when the $^{31}$P chemical shift is referenced to an 85 mass % $H_3PO_4$ solution.

10. The grain-oriented electrical steel sheet according to claim 9, wherein a peak area of the $^{31}$P chemical shift at −32 to −38 ppm is more than 30% of a total peak area when the peak area of the $^{31}$P chemical shift at −32 to −38 ppm and the total peak area are calculated with a Gaussian fitting in which a peak position is determined in a range of 0 to −60 ppm.

11. A grain-oriented electrical steel sheet comprising an insulation coating formed by:
   applying a solution comprising an aqueous solution consisting essentially of a phosphate solution and colloidal silica to at least one surface of the steel sheet, and baking the steel sheet at a temperature of 750-1000° C. to form an insulation coating on the at least one surface of the steel sheet, wherein silica particles of the colloidal silica are surface-modified by aluminate or a solution of the colloidal silica includes aluminate, the aqueous solution is free of chromium, the phosphate solution consists essentially of one or more selected from aluminum phosphate, magnesium phosphate, and manganese phosphate, an amount of the phosphate solution is 25-75 mass % and an amount of the colloidal silica is 75-25 mass % of a total solid mass when the amounts of the phosphate solution and the colloidal silica are calculated in anhydrous form, and the insulation coating consists of phosphorous, silicon, oxygen, and at least one selected from Al, Mg, and Mn.

12. The grain-oriented electrical steel sheet according to claim 11, wherein the insulation coating includes a chemical structure of phosphorus so that a $^{31}$P nuclear magnetic resonance spectrum of the insulation coating shows a $^{31}$P chemical shift at −32 to −38 ppm when the $^{31}$P chemical shift is referenced to an 85 mass % $H_3PO_4$ solution.

13. The grain-oriented electrical steel sheet according to claim 12, wherein a peak area of the $^{31}$P chemical shift at −32 to −38 ppm is more than 30% of a total peak area when the peak area of the $^{31}$P chemical shift at −32 to −38 ppm and the total peak area are calculated with a Gaussian fitting in which a peak position is determined in a range of 0 to −60 ppm.

14. A grain-oriented electrical steel sheet comprising an insulation coating, wherein the insulation coating consists of phosphorous, silicon, oxygen, and at least one selected from Al, Mg, and Mn, the insulation coating is free of chromium and the insulation coating includes a chemical structure of phosphorus so that a $^{31}$P nuclear magnetic resonance spectrum of the insulation coating shows a $^{31}$P chemical shift at −32 to −38 ppm when the $^{31}$P chemical shift is referenced to an 85 mass % $H_3PO_4$ solution.

\* \* \* \* \*